United States Patent [19]

Tan

[11] 3,715,473

[45] Feb. 6, 1973

[54] FIELD-SEQUENTIAL COLOR TELEVISION CAMERA INCLUDING A COLOR FILTER AND ONE CAMERA TUBE

[75] Inventor: Sing Liong Tan, Emmasingel, Netherlands

[73] Assignee: U.S. Philips Corporation, New York, N.Y.

[22] Filed: March 22, 1971

[21] Appl. No.: 126,693

[30] Foreign Application Priority Data

April 18, 1970 Netherlands ........................7005645

[52] U.S. Cl........178/5.4 ST, 178/5.4 C, 178/DIG. 25

[51] Int. Cl..............................H04n 9/06, H04n 9/42

[58] Field of Search.178/5.2 R, 5.4 R, 5.4 CF, 5.4 C, 178/DIG. 25, 5.4 ST

[56] References Cited

UNITED STATES PATENTS 3,475,548 10/1969 McMann, Jr. ......................178/5.4 C 3,506,775 4/1970 McMann, Jr. ......................178/5.4 C

FOREIGN PATENTS OR APPLICATIONS 1,512,352 6/1969 Germany........................178/DIG. 25

*Primary Examiner*—Robert L. Richardson

*Attorney*—Frank R. Trifari

[57] ABSTRACT

A field-sequential color television camera including one camera tube and a color filter. The camera tube is coupled to an aperture correction signal generator and a field-sequential simultaneous converter. The aperture correction signal is added to the picture signal of the camera tube in such a manner that a frequency restricted picture signal providing a poorly detailed image upon display is applied to a memory in the converter. The aperture correction signal which is field-sequential and is maintained field-sequential is added for the purpose of aperture correction to the frequency-restricted picture signals provided simultaneously by the converter.

10 Claims, 4 Drawing Figures

Figure 1:
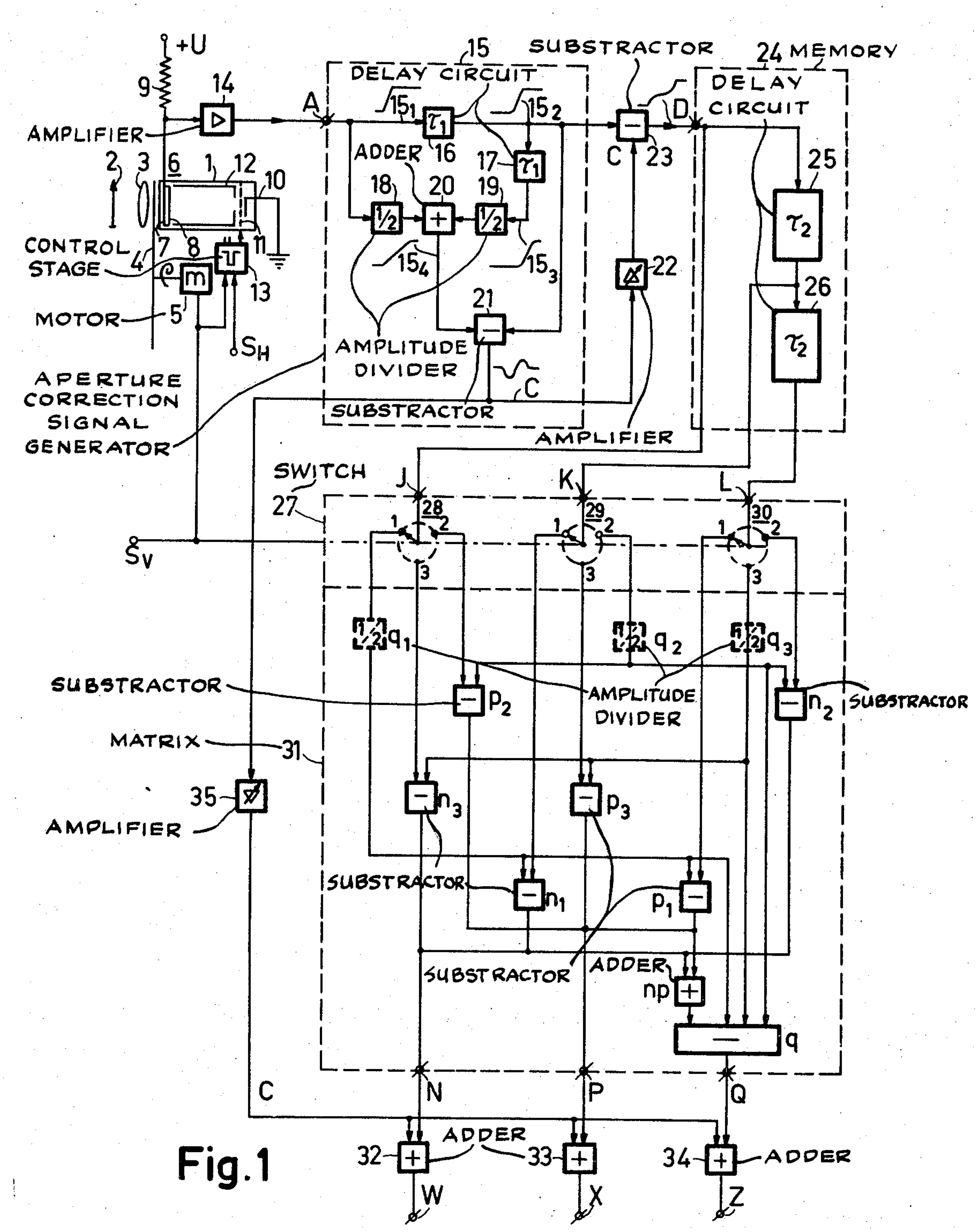

INVENTOR.

SING LIONG TAN

BY

AGENT

*INVENTOR.*
SING LIONG TAN
*BY*
AGENT

FIELD-SEQUENTIAL COLOR TELEVISION CAMERA INCLUDING A COLOR FILTER AND ONE CAMERA TUBE

The invention relates to a field-sequential color television camera including a color filter and one camera tube for generating picture signals said camera tube being coupled to an aperture correction signal generator and to a converter including a memory for converting the picture signals generated field-sequentially by the camera into substantially simultaneously occurring picture signals corresponding to the scene picked up.

Such a color television camera is described in the "-Television Engineering Handbook" by D.G. Fink, on pages 17–98 to 17–103 of the 1957 edition. Particularly on page 17–102 a block diagram shows an embodiment of a converter which may be indicated as a chroma coder. The text states that for converting the picture signals generated field-sequentially, that is to say, in a field sequence, into simultaneously occurring chrominance signals it is required to form the chroma coder with a memory consisting of three parts. The single camera tube is connectable to each part of the memory which parts are formed with a display tube optically coupled to a camera tube. The connection to one of the partial memories is alternately established as a function of the color component of the light passed by the color filter. The camera tubes of the memory provide simultaneous chrominance signals having a certain desired repetition frequency, because the line and field deflection in the display tubes and the single camera tube of the camera is effected three times faster during one third of the repetition period.

The signal applied to the converter is aperture-corrected with the aid of an aperture corrector which is assumed to include an aperture correction signal generator. This means that vague details, contrast or definition in the displayed picture of the scene caused by the finite diameter of an electron beam in the camera tube and by scattering of light in optical systems in front of the camera tube are corrected by adding a correction signal derived from the picture signal of the camera tube to the picture signal for the purpose of increasing the steepness of the edges. The self-evident requirement that the converter will not cause a decrease in definition during signal conversion and influences the performed aperture correction as little as possible, gives rise to imposing stringent requirements on the memory in the converter concerning the storage and recovery of signals.

Apart from the intricacy of the described memory, with which also a conversion of the field scanning gate is realized, it is generally true that a field memory with the described requirement relating to the storage of signals is a very expensive component of a camera. The economy in price of a color television camera based on the field-sequential signal generation as compared with that based on simultaneous signal generation is thereby eliminated.

An object of the present invention is to provide a color television camera in which the converter may be formed with a simple and cheap memory on which no special requirements regarding the storage and recovery of signals are imposed. To this end the camera according to the invention is characterized in that an input of the memory in the converter is connected to a terminal coupled to the camera tube, which terminal conveys picture signals which are restricted in frequency and correspond to a poorly detailed image of the scene, terminals of said converter which convey frequency-restricted picture signals simultaneously provided by the memory being connected to inputs of super-imposition stages, of which other inputs bypass the converter and are all directly coupled for the purpose of aperture correction to a correction signal output of the said aperture correction signal generator.

The invention is based on the recognition of the fact that a sufficiently sharply defined and true image of a scene can be obtained by converting only field-sequentially generated picture signals corresponding to a poorly detailed and poorly defined image into (poorly defined) simultaneous picture signals and to superimpose thereon a field-sequential aperture correction signal without conversion. The use of a simple and cheap memory is then possible. The camera has the advantages of both a field sequential and a simultaneously camera system.

A camera suitable for picking up and handling a scene of colors which are not very saturated is characterized in that the color filter provided near the camera tube includes divided segments associated with a certain field deflection in the camera tube, which segments parts have different light-pass characteristics, while the converter is provided with a switch connected to the memory and a linear matrix circuit for forming previously determined picture signals from the picture signals provided simultaneously by the memory, which picture signals are determined by the color filter construction, said linear matrix circuit being connected to the said superimposition stages connected to the converter.

Furthermore a camera suitable for picking up and handling a scene of saturated colors is characterized in that the divided segments of the color filter are formed with a part passing the light from the scene without a change in definition and color filter action and are formed with a part comprising a color filter using reduction in definition.

Due to the optical descrease in definition it is achieved that the saturated colors in the scene each provide a negligible contribution to the field-sequentially maintained aperture correction signal provided by the aperture correction signal generator.

A camera suitable for picking up and handling a scene of saturated colors in which a correction of the amplitude-versus-frequency characteristic of the picture signals is performed for the purpose of mutually adapting the optical decrease in definition and the operation of the aperture correction signal generator is characterized in that in one group of three divided segments of the color filter one part of each segment passes the light from the scene at a large definition and without color filter action, parts of two segments each having a color filter using a reduction in definition for passing the red and green light components, respectively, of the scene picked up, while the third segment has a part passing the light from the scene with little definition and without color filter action.

Figure 2:
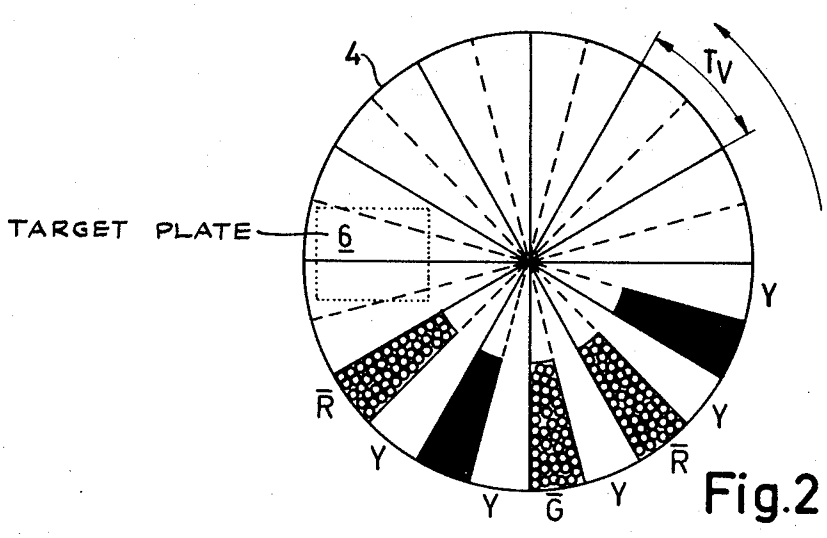
Figure 3:
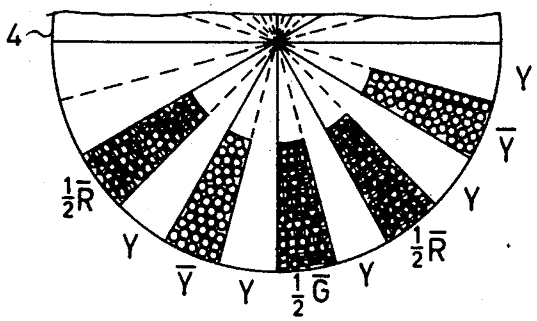
Figure 4:
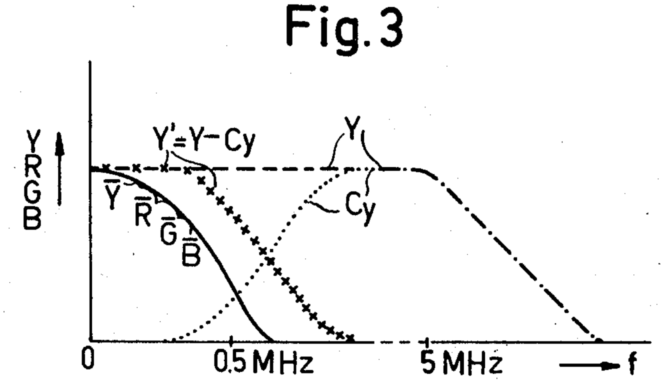

In order that the invention may be readily carried into effect, some embodiments thereof will now be described in detail, by way of example, with reference to the accompanying diagrammatic drawings, in which:

FIG. 1 is a block diagram of an embodiment of a field sequential color television camera according to the invention, FIG. 2 partly shows a color filter embodiment for use in a camera according to FIG. 1, FIG. 3 shows a further color filter embodiment for use in the slightly modified camera according to FIG. 1, and FIG. 4 serves to explain a correction optionally to be performed on the amplitude-versus-frequency characteristic of a few picture signals when using the filter according to FIG. 3.

In FIG. 1, the reference numeral 1 denotes a camera tube which forms part of a color television camera. The camera picks up a scene 2 indicated by an arrow by reproducing it through an optical system 3 and a color filter 4 on the camera tube 1. The color filter 4 is formed, for example, as a rotatable disc which is provided with segments having different light pass characteristics. The segments of the filter 4 are alternately rotated between the optical system 3 and the camera tube 1. FIG. 2 shows a color filter embodiment having divided segments to be described hereinafter. The color filter 4 in FIG. 1 may alternatively be formed as a liquid filter or with rotating prisms.

The rotatable color filter 4 is rotated by a motor 5 which is driven by a signal $S_V$. The light component of the scene 2 passed as a function of the position of color filter 4 is projected onto a target plate 6 in the camera tube 1. The target plate 6 is built up from a transparent conducting signal plate 7 and a photosensitive semiconductor layer 8. The signal plate 7 is connected to a resistor 9 whose other end is connected to a terminal +U. The terminal +U forms part of a voltage source U not shown, another terminal of which is connected to ground.

The camera tube 1 is provided with an electron gun which is built up from a cathode 10 connected to ground, an electrode 11 formed as a Wehnelt cylinder and an acceleration electrode anode 12. The electrode 11 is connected to an output of a control stage 13 inputs of which receive the signal $S_V$ and a signal $S_H$. The signals $S_V$ and $S_H$ are synchronizing signals commonly used for television and associated with the deflection in the field and line directions, respectively. Line and field deflection coils or deflection plates and focussing means not shown in FIG. 1 are connected to other outputs of the control stage 13, which coils cause an electron beam generated by the electron gun (10, 11, 12) to scan the target plate 6 line by line and field by field. In the described camera tube 1, which is of the vidicon type, the scene 2 projected onto the target plate 6 is converted due to the local influence of the conductivity in the semiconductor layer 8 into a charge image on the free surface of the layer 8. The charge image is read out line by line and field by field with the aid of the beam from the electron gun (10, 11, 12) so that a resultant varying voltage drop across the resistor 9 produces a picture signal corresponding to the scene 2. An amplifier 14 which applies the picture signal provided field-sequentially by the camera tube 1 to a terminal A is connected to the junction of resistor 9 and target plate 6. The terminal A conveys a picture signal which is determined by the certain segment of the color filter 4 which is locally present between the camera tube 1 and the optical system 3 during one field period.

The terminal A is connected to an aperture correction signal generator 15 which may be formed for generating an aperture correction signal for the correction into the line and field deflection directions. To explain the operation a few signals are shown in the signal generator 15, which signals are associated with aperture correction in the line direction, which is normally referred to as horizontal aperture correction. The terminal A in the correction signal generator 15 for horizontal aperture correction is connected to two series-arranged delay circuits 16 and 17 whose delay period denoted by $\tau_1$. The circuits 16 and 17 may be formed as delay lines having a delay period of $\tau_1$ which is equal to a fraction of one line period, for example, 100–140 ns. A few signals $15_1$, $15_2$ and $15_3$ are shown at the inputs and outputs of the delay circuits 16 and 17, which signals provide an edge occurring with a certain steepness. This edge may correspond to a brightness or a black-white transistion in the scene 2 occurring in the line direction of scanning in the camera tube 1. The signals $15_1$ and $15_3$ are each applied through divide-by-two circuit 18 and 19 to a superimposition stage 20 formed as an adder an output of which consequently conveys a signal $15_4$. The superimposition provides a signal $15_4$ which has a gentler slope than the signals $15_1$, $15_2$ and $15_3$. The signals $15_2$ and $15_4$ are applied to a superimposition stage 21 formed as a subtractor an output of which conveys a signal C. The signal C shown is the aperture correction signal for the horizontal direction which is provided by the signal generator 15 for further handling.

Usually the signal C is added for the purpose of increasing the edge steepness to the signal $15_2$ for the aperture correction, which involves an increase of the edge steepness corresponding to an enlarged contrast or detail in a reproduction of the scene 2. With the signals $15_2$ and C shown in FIG. 1, this would have to be effected through an adder which would provide an aperture-corrected signal. According to one aspect of the invention, however, aperture correction involving an improvement of the edge steepness is not to be performed, but an edge steepness deterioration. The signal $15_2$ and the signal C occurring through an adjustable amplifier 22 are therefore applied to a superimposition stage 23 acting as a subtractor which provides at a terminal D a signal shown at this terminal. The signal at terminal D would provide a very poorly detailed image of the scene 2 upon display as compared with the signal $15_2$.

The terminal D conveys a field-sequentially occurring picture signal which is not aperture-corrected but has undergone an aperture deterioration. For the horizontal aperture correction this corresponds to a frequency-restricted picture signal at terminal D. Instead of the embodiment shown the signal generator 15 may be formed with a highpass filter connected to terminal A while an output thereof and the terminal A might be connected to the superimposition state 23 formed as a subtractor.

In the embodiment of the signal generator 15 shown this generator may provide a correction signal for the field or vertical deflection direction by rendering the delay times $\tau_1$ of the delay circuits 16 and 17 equal to approximately one line period. The combined vertical and horizontal aperture correction can then be realized by placing lowpass filters between the superimpositions stage 20 and the terminal A and the delay circuit 17.

A part from the embodiment of the aperture correction signal generator 15, the terminal D conveys a field-sequentially occurring frequency-restricted picture signal which would provide a poorly detailed image of the scene 2 upon display. The terminal D is connected to a memory 24 forming part of a field-sequential simultaneous converter. The terminal D is connected in the memory 24 to two series arranged delay circuits 25 and 26, whose delay time is indicated by $\tau_2$. The delay time $\tau_2$ corresponds to one field period. The memory 24 has three outputs which are connected to the inputs and outputs of the delay circuits 25 and 26. These outputs are connected to terminals J, K and L, respectively.

The memory 24 converts picture signals occurring field-sequentially at terminal D and generated by the camera tube 1 into picture signals simultaneously occurring at the terminals J, K and L. For a given picture signal at terminal J, the terminals K and L convey a picture signal which is generated by the camera tube 1 by one and two field periods earlier, respectively. It follows that during the three field periods in which the scene 2 is completely analyzed, that is to say, handled by the camera tube 1, the terminals J, K and L alternately convey during one field period one of the picture signals constituting a cycle of three. As it is desired to always obtain the same picture signal from a cycle of three at a certain terminal, a multiple switch 27 forming part of the field-sequential simultaneous converter is provided. The switch is formed with three three-position selector switches 28, 29 and 30 whose switching arm contacts are connected to the terminals J,K and L, respectively. The positions are denoted by 1, 2, and 3 at the contacts for each selector switch 28, 29, 30, said positions being taken up by the switching arms over approximately one field period. For the purpose of synchronization of switching and rotation of the color filter 4, the switch 27 is coupled to the terminal conveying the signal $S_V$. The switch 27 is shown as a mechanical switch, but in practice it is formed as an electronic switch.

In one embodiment of the color filter 4 with segments alternately passing in groups of three, for example, the green (G), red (R) and blue (B) light component of the scene 2, the contacts denoted by the reference numerals 1, 2 and 3 of the switches 28, 29 and 30 may each be interconnected to a differently numbered contact of the other switches. In this manner the field-sequential simultaneous converter (24, 27) consisting of the memory 24 and the switch 27 may have three outputs not shown which may be connected to three terminals denoted by the references N, P and Q in FIG. 1. As will be apparent hereinafter, it is useful not to filter out the green, red and blue light components from the scene 2 occurring as primary colors with the aid of color filter 4, but to filter out a combination thereof, and consequently a linear matrix circuit 31 is provided between the switch 27 and the terminals N, P and Q.

The construction of the linear matrix circuit 31 mainly relates to the embodiment of the color filter 4 shown in FIG. 2 and with the addition of components shown in broken lines it relates to FIG. 3. The linear matrix circuit 31 will be described in detail with reference to FIGS. 2 and 3. Here there applies, however, that the terminals N, P and Q convey the simultaneously occurring frequency-restricted picture signals which correspond to the green, red and blue light light components, respectively, from the scene 2 and which are derived from the three frequency-restricted picture signals occurring field-sequentially at terminal D.

The terminals N, P and Q are connected to the respective inputs of superimposition stages 32, 33 and 34 formed as adders. Other inputs of the superimposition stages 32, 33 and 34 are interconnected and are coupled through an adjustable amplifier 35 to an output of the correction signal generator 15 conveying the aperture-correction signal C. The outputs of the stages 32, 33 and 34 are connected to terminals W, X and Z, respectively. The terminals W, X and Z consequently convey aperture-corrected signals which are composed of simultaneously occurring frequency-restricted signals supplied by the converter (24, 27, 31) and a field-sequentially occurring aperture correction signal C supplied by signal generator 15.

In the color television camera according to the invention no stringent requirements are imposed on the storage and recovery of signals in the memory 24 by the field-sequential simultaneous conversion of the frequency-restricted picture signals only. The memory 24 may include, for example, delay circuits 25 and 26 delaying over one field period and being formed as a wire delay line including material exhibiting the so-called magnetostriction effect. Such wire delay lines are described inter alia in Philips Technical Review Vol 25 No 9 1963–64 pages 234–252. Alternatively television camera tubes maybe used as delay circuit 25 or 26 in which the signal to be delayed is applied to a cathode of an electron gun present therein, while a combination of the instantaneously applied signal and a signal occurring one field period earlier is obtained at the signal plate output. Alternatively magnetic disc memories may be used.

When using a delay circuit 25 or 26 having a higher frequency range than is necessary for the frequency-restricted picture signals, one delay circuit 25 in the memory 24 may be sufficient. The picture signal which is delayed once could be passed once more through the delay circuit 25 after modulation of a subcarrier.

A few possible embodiments of the color filter 4 and the construction of the switch 27 adapted thereto and the linear matrix circuit 31 which is present or not present are described for the purpose of illustration.

Starting from an initial zero state, six field periods are considered in which two groups of three segments of the color filter 4 occur between the scene 2 and the camera tube 1. Dependent on the segments of the filter 4, the green, red or blue light component of the scene 2 or a combination thereof falls on the target plate 6 of the camera tube 1 during one field period, and this provides a G, R or B picture signal or a combination thereof at terminal A. A segment of filter 4 which without color filter action passes the light from the scene 2 unhampered, provides in known manner a picture signal Y corresponding to the local brightness of the light in which $Y = R + G + B$.

The aperture correction signal generator 15 provides a correction signal $C_G$, $C_R$, $C_B$ and $C_Y$ for the picture signals $G$, $R$, $B$ and $Y$, and for a combination of, for example, $G + R$ it provides a correction signal $C_{G+R}$. A picture signal minus the aperture correction signal derived therefrom appears at terminal D, which produces a picture signal with index notation, for example, $R - C_R = R'$, $Y - C_Y = Y'$ and $(G+R) - C_{G+R} = (G+R)$.

In this manner there follows, for example,

TABLE 1.

| Field | Terminal A | Signal C | Terminal D | Terminals J K | Terminals L |
|---|---|---|---|---|---|
| 1 | R | $C_R$ | R' | R' | |
| 2 | G | $C_G$ | G' | G'R' | |
| 3 | B | $C_B$ | B' | B'G' | R' |
| 4 | R | $C_R$ | R' | R'B' | G' |
| 5 | G | $C_G$ | G' | G'R' | B' |
| 6 | B | $C_B$ | B' | B'G' | R' |
| | | | | B' | G' |
| | | | | | B' |

The fields 3, 4 and 5 constitute a cycle which is continued in subsequent three fields.

During the fields 3, 4 and 5 the switching arms of the switch 27 are connected to the contacts 1, 2 and 3, respectively. The linear circuit 31 is absent and the contacts 1, 2 and 3 of the switches 28, 29 and 30 are connected, for example, to the terminals N, P and Q as follows:

Terminals N = contact $\mathbf{28_3}$ = contact $\mathbf{29_1}$ = contact$\mathbf{30_2}$.
Terminal P = contact $\mathbf{28_2}$ = contact $\mathbf{29_3}$ = contact $\mathbf{30_1}$.
Terminal Q = contact $\mathbf{28_1}$ = contact$\mathbf{29_2}$ = contact $\mathbf{30_3}$.

It follows therefrom, that the signals G', R', B' are always present at terminals N, P, Q.

In one field cycle there follow for the terminals

| | W | X | Z |
|---|---|---|---|
| the signals: | field 3: $G'+C_B$ | $R'+C_B$ | $B'+C_B$, |
| | field 4: $G'+C_R$ | $R'+C_R$ | $B'+C_R$, |
| | field 5: $G'+C_G$ | $R'+C_G$ | $B'+C_G$. |

It is found that the terminals W, X and Z convey simultaneous frequency-restricted picture signals G', R' and B' which are derived from an instantaneous field, a previous field and a field preceding the previous field, while a field-sequentially occurring aperture correction signals $C_G$, $C_R$ or $C_B$ is instantaneously superimposed thereon for each picture signal. The aperture correction signal $C_G$, $C_R$ or $C_B$ becomes manifest as a brightness aperture correction signal due to the synchronous superimposition on all three picture signals. The large planes in a scene 2 are simultaneously displayed while the details, the edges of the planes are provided by a field-sequential aperture correction signal.

A satisfactory reproduction is obtained upon display of a scene 2 in which there are no great differences between the values of the different aperture correction signals $C_B$, $C_R$ and $C_G$. However, if great differences occur between the correction signals $C_B$, $C_R$ and $C_G$, these become manifest as a flickering in brightness in the details upon display.

The color filter 4 may alternatively be formed in such a manner that the signals R, G and Y occur instead of the picture signals R, G and B on terminal A. In the given embodiment the signals B, B' and $C_B$ are to be changed into signals Y, Y' and $C_Y$. The switch 27 must then be connected through an adapted embodiment not shown of the linear matrix circuit 31 to the terminals N, P and Q, because the signal B is derived in accordance with the relation $B = Y - R - G$.

If a certain color, for example, green is predominant in the scene 2, the choice may be made to have each segment of the color filter 4 pass the green light from the scene 2 entirely or partly. To this end the segments of the filter 4 may be divided into two partial segments each having a different light-pass characteristic. In one cycle of three fields the terminal A receive, for example, the picture signals $G + R$, $G + B$, and $G$. Three successive segments of the color filter 4 are then formed with partial segments including a green, red; green, blue and green, black filter. In the manner as described in — Table 1 and by using an adapted embodiment of the linear matrix circuit 31 so as to produce the signals R and B by subtraction from the signal $G$, the converted signals G', R' and B' are obtained on which the aperture correction signals $C_G$, $C_{G+R}$ and $C_{G+B}$ are superimposed over three field periods. For a predominantly green scene 2 no flickering in brightness in the details occurs upon display.

A change in the predominant color requires an adaptation of the color filter 4. It is evident that a cycle involving signals $Y + R$, $Y + G$ and $Y$ may alternatively be used together with the aperture correction signals $C_Y$, $C_{Y+R}$ and $C_{Y+G}$. However, in case of great color differences and saturated colors in the scene 2 a flickering in brightness in the details continues to occur upon display.

FIG. 2 shows an embodiment of the color filter 4 of FIG. 1 with which a scene 2 having saturated colors can be satisfactorily handled by the camera. Five segments of the color filter 4 in FIG. 2 are shown in greater detail. In one segment the reference T indicates one field period. The region of a field scanned by an electron beam is denoted by dotted lines on the target plate 6 of the camera tube 1. The segments of the color filter 4 each consist of a part which passes the light from the scene 2 without color filter action and which is denoted by Y. Y corresponds to the picture signal Y which depends on the local brightness of the scene 2. When reproducing the picture signal Y an image of the scene having a normal definition is obtained. The reference $\bar{R}$ and $\bar{G}$ denote partial segments on which a red and a green color filter having a definition reducing influence are provided, respectively. The segments $\bar{R}$ and $\bar{G}$ correspond to picture signals $\bar{R}$ and $\bar{G}$ which are restricted in frequency by optical means so that an image having a reduction in detail appears upon display. The optical definition decrease may be obtained with a lens-shaped grid shown diagrammatically. Partial segments provided with a black filter, that is to say, an opaque part are provided without any further notation.

The split-up of the segments of the color filter 4 into two halves without and with a change in definition results in a sharp image of the scene 2 being projected onto the camera tube 1 during half a field period $T_V$ and an unsharp image without many details during the next half field period $T_V$. The composite picture signal provided by the camera tube 1 over one full field period $T_V$ thus corresponds to a superimposition of the said sharp and unsharp images of the scene 2 on the target plate 6. The result is that the aperture correction signal generator 15 only derives information from that part of the composite picture signal which corresponds to the sharp image on the camera tube 1.

Starting from an arbitrarily chosen initial zero state, a Table 2 analogous to Table 1 follows.

TABLE 2

| Field | Terminal A | Signal C | Terminal D | Terminals J | K | L |
|---|---|---|---|---|---|---|
| 1 | $Y+\overline{R}$ | $C_Y$ | $Y'+\overline{R}$ | $Y'+\overline{R}$ | | |
| 2 | $Y+\overline{G}$ | $C_Y$ | $Y'+\overline{G}$ | $Y'+\overline{G}$ | $Y'+\overline{R}$ | |
| 3 | $Y$ | $C_Y$ | $Y'$ | $Y'$ | $Y'+\overline{G}$ | $Y'+\overline{R}$ |
| 4 | $Y+\overline{R}$ | $C_Y$ | $Y'+\overline{R}$ | $Y'+\overline{R}$ | $Y'$ | $Y'+\overline{G}$ |
| 5 | $Y+\overline{G}$ | $C_Y$ | $Y'+\overline{G}$ | $Y'+\overline{G}$ | $Y'+\overline{R}$ | $Y'$ |
| 6 | $Y$ | $C_Y$ | $Y'$ | $Y'$ | $Y'+\overline{G}$ | $Y'+\overline{R}$ |
| | | | | | $Y'$ | $Y'+\overline{G}$ |
| | | | | | | $Y'$ |

The fields 3, 4 and 5 constitute one cycle which is continued in subsequent three fields. During the fields 3, 4 and 5 the switching arms of the switch 27 are connected to the contacts 1, 2 and 3, respectively. The camera is provided with the embodiment of the linear matrix circuit 31 shown in solid lines in FIG. 1. In the linear matrix circuit 31 the switch contacts $28_1$, $29_2$ $30_3$ conveying the Y'-signal over three field periods are connected to superimposition stages $n_1$, $p_1$; $n_2$, $p_2$ and $n_3$, $p_3$ formed as substractors. Other inputs of these superimposition stages are connected to the switch contacts $29_1$, $30_1$; $30_2$, $28_2$ and $28_3$, $29_3$ conveying the signal $Y'+\overline{G}$ and $Y'+\overline{R}$, respectively. The outputs of the superimposition stages $n_1$, $n_2$, $n_3$ and $p_1$, $p_2$, $p_3$ providing the $\overline{G}$ signal, respectively, are connected to the terminals N and P, respectively. The terminals N and P are connected in the linear matrix circuit 31 to a superimposition stage *np* formed as an adder whose output conveying the signal $\overline{G}+\overline{R}$ is connected to a superimposition stage *q* formed as a subtractor. Other inputs of the stage *q* are connected to the switch contacts $28_1$, $29_2$ and $30_3$ conveying the Y' signal so that the output thereof which is connected to the terminal Q conveys the signal $Y'-\overline{G}-\overline{R}=Y'-\overline{Y}+\overline{B}$ because $\overline{Y}=\overline{R}+\overline{G}+\overline{B}$.

Consequently, the signals $\overline{G}$, $\overline{R}$ and $\overline{B}+Y'-\overline{Y}$ are always present on the terminals N, P and Q. The terminals W, X and Z convey the signals $\overline{G}+C_Y$, $\overline{R}+C_Y$ and $\overline{B}+(Y'-\overline{Y})+C_Y$ after the superimposition performed in the stages 32, 33 and 34. Due to the optical definition decrease obtained with the partial segments $\overline{G}$ and $\overline{R}$ in the color filter 4 according to FIG. 2 it is achieved that saturated colors in the scene 2 of FIG. 1 do not contribute to the correction signal $C = C_Y$ provided by the field-sequential aperture correction signal generator 15.

It is found that the signal occurring at the terminal Q relative to the signals at the terminals N and P has an additional component $Y'-\overline{Y}$. The influence thereof may be explained with reference to FIG. 4. The amplitude-versus-frequency characteristics of the signals Y, R, G and B are plotted in FIG. 4. The signal Y has an idealized frequency characteristic which up to, for example, a frequency $f$ = 5 MHz substantially has no variation and then drops. The definition reduction optially performed by a few partial segments of the color filter 4 in FIG. 2 gives a characteristic in FIG. 4 which is denoted by $\overline{Y}$, $\overline{R}$, $\overline{G}$ and $\overline{B}$. The aperture correction signal Y derived from the signal Y shown is denoted by $C_Y$ while it follows by subtraction that the signal $Y'=Y-C_Y$. The frequency characteristics of the signals Y' (made electronically) and $\overline{Y}$ (made optically) are normally found to be different. It is desirable that each picture signal obtained after all signal handling and signal combinations approximates as satisfactory as possible the idealized frequency characteristic of the signal Y shown. For the derived signals $\overline{G}+C_Y$ and $\overline{R}+C_Y$ it follows that this approximation does not apply in a satisfactorily manor because $\overline{G} \neq G'$ and $\overline{R} \neq R'$ which is required for a correct approximation. For the signal $\overline{B}+(Y'-\overline{Y})+C_Y$ it follows that the approximation just applies because the component $Y'-\overline{Y}$ added to the signal $\overline{B}$ produces a signal having a characteristic in accordance with the signal B' which with the correction signal $C_Y$ produces a flat frequency characteristic. In this manner an ideal correction of the amplitude-versus-frequency characteristic is achieved on one of the three chrominance signals.

FIG. 3 diagrammatically shows an embodiment of the color filter 4, with which an ideal correction of two of the three chrominance signals is possible. The partial segments are denoted by Y, $\overline{Y}$, $\frac{1}{2}\overline{R}$ and $\frac{1}{2}\overline{G}$. The factor one-half may be obtained by forming the color filter with a so-called grey filter as is shown or by adapting the light-transmitting part of the partial segment. The linear matrix circuit in FIG. 1 is then formed with 2-to-1 dividers $q_1$, $q_2$ and $q_3$ connected to the switch contacts $28_1$, $29_2$ and $30_3$.

A Table 3 follows from FIG. 3, starting from an arbitrarily chosen initial zero state likewise as in Tables 1 and 2.

TABLE 3

| Field | Terminal A | Signal C | Terminal D | Terminals J | K | L |
|---|---|---|---|---|---|---|
| 1 | $Y+\frac{1}{2}\overline{R}$ | $C_Y$ | $Y'+\frac{1}{2}\overline{R}$ | $Y'+\frac{1}{2}\overline{R}$ | | |
| 2 | $Y+\frac{1}{2}\overline{G}$ | $C_Y$ | $Y'+\frac{1}{2}\overline{G}$ | $Y'+\frac{1}{2}\overline{G}$ | $Y'+\frac{1}{2}\overline{R}$ | |
| 3 | $Y+\overline{Y}$ | $C_Y$ | $Y'+\overline{Y}$ | $Y'+\overline{Y}$ | $Y'+\frac{1}{2}\overline{G}$ | $Y'+\frac{1}{2}\overline{R}$ |
| 4 | $Y+\frac{1}{2}\overline{R}$ | $C_Y$ | $Y'+\frac{1}{2}\overline{R}$ | $Y'+\frac{1}{2}\overline{R}$ | $Y'+\overline{Y}$ | $Y'+\frac{1}{2}\overline{G}$ |
| 5 | $Y+\frac{1}{2}\overline{G}$ | $C_Y$ | $Y'+\frac{1}{2}\overline{G}$ | $Y'+\frac{1}{2}\overline{G}$ | $Y'+\frac{1}{2}\overline{R}$ | $Y'+\overline{Y}$ |
| 6 | $Y+\overline{Y}$ | $C_Y$ | $Y'+\overline{Y}$ | $Y'+\overline{Y}$ | $Y'+\frac{1}{2}\overline{G}$ | $Y'+\frac{1}{2}\overline{R}$ |
| | | | | | $Y'+\overline{Y}$ | $Y'+\frac{1}{2}\overline{G}$ |
| | | | | | | $Y'+\overline{Y}$ |

The fields 3, 4, and 5 constitute a cycle which is continued in subsequent three fields. During the fields 3, 4 and 5 the switching arms of the switch 27 are connected to the contacts 1, 2 and 3, respectively, so that it follows from the linear matrix circuit 31 according to FIG. 1 that:

Terminal N: $Y'+\frac{1}{2}\overline{G}-\frac{1}{2}Y'-\frac{1}{2}\overline{Y}=\frac{1}{2}\overline{G}+\frac{1}{2}(Y'-\overline{Y})$ Terminal P: $Y'+\frac{1}{2}\overline{R}-\frac{1}{2}Y'-\frac{1}{2}\overline{Y}=\frac{1}{2}\overline{R}+\frac{1}{2}(Y'-\overline{Y})$ Terminal Q: $\frac{1}{2}Y'-\frac{1}{2}\overline{Y}-(\frac{1}{2}\overline{G}+\frac{1}{2}Y'-\frac{1}{2}\overline{Y})-(\frac{1}{2}\overline{R}+\frac{1}{2}Y'-\frac{1}{2}\overline{Y})=\frac{1}{2}\overline{B}-\frac{1}{2}Y'$, for $\overline{Y}=\overline{R}+\overline{G}+\overline{B}$.

For the terminals W, X and Z it follows that:

Terminal W: $\frac{1}{2}\overline{G} + \frac{1}{2}(Y' - \overline{Y}) + C_Y$

Terminal X: $\frac{1}{2}\overline{R} + \frac{1}{2}(Y' - \overline{Y}) + C_Y$

Terminal Z: $\frac{1}{2}\overline{B} - \frac{1}{2}Y' + C_Y$.

It is found that the signals at the terminals W and X obtain a substantially ideal correction of the frequency characteristic as is explained in the description of FIG. 4. The signal at terminal Z corresponding to the blue light component of the scene 2 in FIG. 1 is uncorrected which is admissible because this component is generally small relative to the green and red light components.

The adjustable amplifier 35 may be adjusted for color enhancement in such a manner that the aperture correction signal C contributes more than is necessary to straighten the frequency characteristic in FIG. 4.

A comparison of the known field-sequential camera formed with a red-green-blue color filter and the described camera according to the invention provides the following aspects.

The sensitivity of the camera which is determined by the noise and inertia in the camera tube is poor in the known field-sequential camera, because the noise occurs uncorrelated in the three different partial images on the target plate of the camera tube and is therefore added together in accordance with a function with the root of the sum of the squares of the components. The sensitivity of the described camera is better because one and the same light component having a correlated high frequency noise in all partial images occurs (for example, Y in Tables 2 and 3).

Picking up moving images in the known field-sequential cameras creates the problem of the so-called color break. This is a smear or rim occurring in different colors behind the moving part in the scene and is caused by the displacement occurring during the necessary delay period of two field periods in the memory of the field-sequential simultaneous converter. Upon display the partial pictures then no longer register with each other. In the described camera the movement in the scene becomes instantaneously manifest in the field-sequentially maintained aperture correction signal which appears as a luminance signal upon display. The color break consequently occurs to a greatly reduced extent.

The quality of the known field-sequential cameras is determined to a great extent by the construction of the memory in the sequential simultaneous converter. For realizing a richly detailed image upon display, the requirement applies that the memory must be able to handle high frequency signals and consequently the memory is expensive. As has been described in this application a very cheap memory having a limited frequency range may be used in the camera described.

As compared with a color television camera formed with a plurality of camera tubes on which the light coming from the scene is divided by means of a beam splitter, the described camera has a greater sensitivity due to the absence of the beam splitter. The definition of a scene displayed is then better due to the monochrome television character of the above-described camera. This character is also advantageous when picking up moving images because in a camera including a plurality of camera tubes an inertia restriction is imposed by the chrominance channel in which a chrominance signal occurs at the minimum admitted signal level in connection with inertia effects attendent therewith. Due to the light being not split, the camera according to the invention always has a sufficient signal level to prevent these inertia effects.

What is claimed is:

1. A circuit comprising a television camera means for providing a field sequential signal of a selected bandwidth; means coupled to said camera for reducing the bandwidth of said signal and for providing an aperture correction signal; means coupled to said reducing means for converting said sequential signal into a reduced bandwidth simultaneous signal; and means coupled to said converting means and to said reducing means to receive said simultaneous signal and said aperture correction signal for at least partially restoring the bandwidth of said simultaneous signal.

2. A circuit as claimed in claim 1 wherein said camera comprises a camera tube and a color filter disposed in front of said camera; said reducing means comprises an aperture correction signal generator coupled to said tube; said converting means comprises a memory coupled to said generator; and said restoring means comprises a plurality of superposition stages each having a first input coupled to said converting means, a second input coupled to said generator, and an output means for supplying said at least partially bandwidth restored signal.

3. A circuit as claimed in claim 2 wherein said filter comprises a plurality of segments determined by the camera field deflection, adjacent segments having different light transmission characteristics; said converter comprising a switching means coupled to said memory and a linear matrix means coupled between said memory and said first inputs for forming selected picture signals provided by said memory and determined by said color filter.

4. A circuit as claimed in claim 3 wherein said each of segments comprise a first part for passing light at a high definition and a second part for passing light with a definition reduction.

5. A circuit as claimed in claim 4 wherein said segments are arranged in groups of three; within each of said groups said high definition parts passing substantially all visible colors, two of said reduced definition parts passing substantially only red and green light, and a low definition part passing substantially all of visible colors.

6. A circuit as claimed in claim 3 wherein said segments comprise groups of three segments, one of said segments in each of said groups comprising two parts passing light from the total scene and at a definition reduction with all colors being passed.

7. A circuit as claimed in claim 3 wherein each of said reduced definition parts comprises a lense shaped grid.

8. A circuit as claimed in claim 2 further comprising a subtracting stage having an input coupled to said aperture generator, an output coupled to said memory, and a substracting input coupled to said generator to receive an aperture correction signal.

9. A circuit as claimed in claim 2 wherein said generator comprises both a horizontal and vertical aperture correction signal generator.

10. A circuit as claimed in claim 2 further comprising an adjustable amplifier coupled between said generator and said second inputs.

* * * * *